United States Patent
Ahn et al.

(10) Patent No.: US 9,553,338 B2
(45) Date of Patent: Jan. 24, 2017

(54) LITHIUM SECONDARY BATTERY

(71) Applicant: LG Chem, Ltd., Seoul (KR)

(72) Inventors: Kyoung Ho Ahn, Daejeon (KR); Jeong Woo Oh, Daejeon (KR); Min Jung Kim, Daejeon (KR); Doo Kyung Yang, Daejeon (KR); Chul Haeng Lee, Daejeon (KR); Yi Jin Jung, Daejeon (KR)

(73) Assignee: LG Chem, Ltd. (KR)

( * ) Notice: Subject to any disclaimer, the term of this patent is extended or adjusted under 35 U.S.C. 154(b) by 35 days.

(21) Appl. No.: 14/419,504

(22) PCT Filed: Oct. 31, 2014

(86) PCT No.: PCT/KR2014/010361
§ 371 (c)(1),
(2) Date: Feb. 4, 2015

(87) PCT Pub. No.: WO2015/065102
PCT Pub. Date: May 7, 2015

(65) Prior Publication Data
US 2016/0028127 A1 Jan. 28, 2016

(30) Foreign Application Priority Data

Oct. 31, 2013 (KR) .......... 10-2013-0131473
Oct. 31, 2014 (KR) .......... 10-2014-0150126

(51) Int. Cl.
*H01M 10/052* (2010.01)
*H01M 10/42* (2006.01)
(Continued)

(52) U.S. Cl.
CPC ....... *H01M 10/4235* (2013.01); *H01M 2/1653* (2013.01); *H01M 2/1666* (2013.01);
(Continued)

(58) Field of Classification Search
CPC .............. H01M 10/052; H01M 10/0565
See application file for complete search history.

(56) References Cited

U.S. PATENT DOCUMENTS 6,025,092 A 2/2000 Doyle et al.
6,743,549 B1 * 6/2004 Doyle ............... H01M 6/164
252/182.1

(Continued)

FOREIGN PATENT DOCUMENTS

EP 1371639 A2 12/2003
JP H10284128 A 10/1998
(Continued)

OTHER PUBLICATIONS

Argade, et al., "Polymer Electrolytes for a Rechargeable Li-ion Battery." Proceedings of the Power Sources Conference, Sep. 11, 1996, pp. 299-302, XP008177281.
Kang Xu, "Nonaqueous Liquid Electrolytes for Lithium-Based Rechargeable Batteries." Chemical Reviews, vol. 104, No. 10, Sep. 16, 2004, pp. 4303-4418, XP055139331.
Extended Search Report from European Application No. 14830490, dated Sep. 1, 2015.
(Continued)

*Primary Examiner* — Stewart Fraser
*Assistant Examiner* — Olatunji Godo
(74) *Attorney, Agent, or Firm* — Lerner, David, Littenberg, Krumholz & Mentlik, LLP (57) ABSTRACT

The present invention relates to a lithium secondary battery including a cathode, an anode, a separator disposed between the cathode and the anode, and a non-aqueous electrolyte. An ionomer is included in at least one element selected from the group consisting of the cathode, the anode, the separator, and the non-aqueous electrolyte.

11 Claims, 5 Drawing Sheets

(51) Int. Cl.
| | |
|---|---|
| *H01M 10/0567* | (2010.01) |
| *H01M 2/16* | (2006.01) |
| *H01M 4/62* | (2006.01) |
| *H01M 10/0568* | (2010.01) |
| *H01M 10/0569* | (2010.01) |
| *H01M 4/04* | (2006.01) |
| *H01M 4/13* | (2010.01) |
| *H01M 4/131* | (2010.01) |
| *H01M 4/133* | (2010.01) |
| *H01M 4/139* | (2010.01) |
| *H01M 4/1391* | (2010.01) |
| *H01M 4/1393* | (2010.01) |

(52) U.S. Cl.
  CPC ....... *H01M 2/1686* (2013.01); *H01M 4/0404* (2013.01); *H01M 4/13* (2013.01); *H01M 4/62* (2013.01); *H01M 10/052* (2013.01); *H01M 10/0567* (2013.01); *H01M 10/0568* (2013.01); *H01M 10/0569* (2013.01); *H01M 4/131* (2013.01); *H01M 4/133* (2013.01); *H01M 4/139* (2013.01); *H01M 4/1391* (2013.01); *H01M 4/1393* (2013.01); *H01M 4/623* (2013.01); *H01M 2300/0025* (2013.01); *Y02E 60/122* (2013.01); *Y02T 10/7011* (2013.01)

(56) References Cited

U.S. PATENT DOCUMENTS

| | | | |
|---|---|---|---|
| 2004/0266924 A1* | 12/2004 | Yang | C08K 5/548 524/262 |
| 2006/0177732 A1* | 8/2006 | Visco | H01M 2/1686 429/144 |
| 2006/0252888 A1 | 11/2006 | Lochhaas et al. | |
| 2011/0262796 A1 | 10/2011 | Shimooka et al. | |
| 2012/0231336 A1* | 9/2012 | Kim | H01M 4/131 429/217 |
| 2013/0181677 A1 | 7/2013 | Kourtakis et al. | |
| 2013/0250485 A1 | 9/2013 | Kaye et al. | |

FOREIGN PATENT DOCUMENTS

| | | |
|---|---|---|
| JP | 2011159503 A | 8/2011 |
| JP | 2011174032 A | 9/2011 |
| KR | 20000052944 A | 8/2000 |
| KR | 20010040945 | 5/2001 |
| KR | 100541312 B1 | 1/2006 |
| KR | 20080003857 A | 1/2008 |
| WO | 2013101299 A1 | 7/2013 |

OTHER PUBLICATIONS

International Search Report for Application No. PCT/KR2014/010361 dated Jan. 29, 2015.

* cited by examiner

LITHIUM SECONDARY BATTERY

CROSS-REFERENCE TO RELATED APPLICATION

This application is a national phase entry under 35 U.S.C. §371 of International Application No. PCT/KR2014/010361, filed Oct. 31, 2014, which claims priority to Korean Patent Application No. 10-2013-0131473, filed Oct. 31, 2013 and Korean Patent Application No. 10-2014-0150126, filed Oct. 31, 2014, the disclosures of which are incorporated herein by reference.

TECHNICAL FIELD

The present invention relates to a lithium secondary battery having high temperature stability and high power by including an ionomer having a fluoroalkyl sulfonate substituent in at least one element of a cathode, an anode and a separator.

BACKGROUND ART

As an applying field of energy storage technique is enlarged to a cellular phone, a camcorder, a laptop PC and an electrical vehicle, efforts on studying and developing batteries have been increasingly concretized, and an electrochemical device receives the most attention in this aspect.

Particularly, according to the trend of electronic devices, efforts on developing a lithium secondary battery having small size, light weight and capable of charging and discharging in high capacity have been continued.

The lithium secondary battery is composed of a cathode and an anode, which include an electrode active material that may intercalate and deintercalate lithium ions, a separator disposed therebetween and an electrolyte as a delivering medium of the lithium ions.

Meanwhile, as the applying field of the lithium secondary battery is gradually enlarged, a battery including an organic polymer including an ionic side group, for example, an 'ionomer' compound in at least one element constituting the lithium secondary battery is known to maintain good performance in a severe environment such as high temperature or low temperature environment (see Patent Document 1).

That is, in the case in which a compound of an ionomer type is introduced in at least one element constituting the lithium secondary battery, an ion conductive layer may be formed on the surface of a constituting element or a gel type electrolyte may be formed, thereby realizing battery properties, which is normally difficult to obtain when using a liquid electrolyte.

PRIOR ART DOCUMENTS

Patent Document 1: Korean Patent Laid-open No. 10-2000-0052944
Patent Document 2: Korean Registered Patent No. 10-0541312

DISCLOSURE OF THE INVENTION

Technical Problem

A lithium secondary battery is recognized to secure the battery properties thereof in high temperature or high voltage environment by including an ionomer having a fluoroalkyl sulfonate substituent during manufacturing at least one element of a cathode, an anode, a separator and an electrolyte in a lithium secondary battery composed of the elements, and the present invention has been completed.

Particularly, in a lithium secondary battery composed of a cathode, an anode, a separator disposed therebetween and a non-aqueous electrolyte, the lithium secondary battery including an ionomer having a fluoroalkyl sulfonate substituent in at least one element selected from the group consisting of the cathode, the anode, the separator and the non-aqueous electrolyte is provided.

Technical Solution

According to an aspect of the present invention to solve the above-described defects, there is provided a lithium secondary battery including a cathode, an anode, a separator disposed between the cathode and the anode and a non-aqueous electrolyte, wherein an ionomer represented by the following Formula 1 is comprised in at least one element selected from the group consisting of the cathode, the anode, the separator and the non-aqueous electrolyte.

[Formula 1]

In the above Formula, A and B are independently H, F, $CH_3$, $CF_3$ or $CF_2H$, a molar ratio of $-CF-O-(CF_2)_2-SO_3^-Li^+$:$-CF_2-$ is 10 to 100:0 to 90, and k is an integer of at least 1.

In addition, a weight average molecular weight of the ionomer represented by the above Formula 1 may be from 240 to 200,000.

In the present invention, the cathode may include the ionomer represented by the above Formula 1 in a composition of the cathode or a coating component of the cathode.

In the present invention, the anode may include the ionomer represented by the above Formula 1 in a composition of the anode or a coating component of the anode.

In addition, the separator may include the ionomer represented by the above Formula 1 in a constituting component of the separator or a coating component of the separator.

In addition, the non-aqueous electrolyte may include the ionomer represented by the above Formula 1 as an additive.

Advantageous Effects

The secondary battery of the present invention may secure high ionic conductivity, improved mechanical properties, etc. by including an ionomer having a fluoroalkyl sulfonate substituent in at least one element constituting a secondary battery, and further may realize the stability thereof by obtaining high power effects through solving the concentration polarization of the secondary battery and by improving life improving effects through preventing the elution of a transition metal in even high temperature or a high voltage environment.

BRIEF DESCRIPTION OF THE DRAWINGS

Preferred embodiments of the invention will be illustrated with reference to the accompanying drawings. The drawings are illustrated for further understanding of the technical spirit of present invention and the above-described contents of the invention, and the present invention should not be construed as limited to the disclosure in the drawings.

BEST MODE FOR CARRYING OUT THE INVENTION

Hereinafter, the present invention will be described in more detail to assist the understanding of the present invention. It will be understood that terms or words used in the specification and claims, should not be interpreted as having a meaning that is commonly used or defined in dictionaries, but should be interpreted as having a meaning that is consistent with their meaning in the context of the present invention on the basis of the principle that the concept of the terms may be appropriately defined by the inventors for the best explanation of the invention.

In a common lithium secondary battery, side reactions according to the decomposition of an electrolyte salt including the generation of gas, for example, a HF gas, inducing the corrosion of a battery, may be induced through the reaction of water penetrated into a secondary battery with the anions of the electrolyte salt included in a non-aqueous electrolyte during the operation of the secondary battery in a high temperature and a high voltage. The side reactions may be induced further with the elevation of the temperature. In addition, the elution of the transition metal of a cathode material may be accelerated by the generated HF gas to be a factor of inhibiting the cycle life and stability of the secondary battery. To improve the defects, a method of decreasing the amount of the electrolyte salt in an electrolyte has been suggested recently. In this case, high voltage safety was improved, however battery resistance was increased due to concentration polarization phenomenon, etc., thereby generating another defects of power reduction and the decrease of the cycle life of the secondary battery.

Recently, a method of introducing an ionomer type compound in an element constituting a lithium secondary battery has been suggested to improve the above-described defects. According to the above method, the properties of a lithium secondary battery in high temperature or high voltage environment, which may be difficult to overcome using a liquid electrolyte, may be realized.

However, in an ionomer compound having a long side chain, for example, a long side chain including $SO_3^-$ enabling the substitution of Li, Li substitution ratio with respect to weight may decrease even though introducing a polymer having the same structure. Thus, self-assembling properties for forming a micro channel affecting ion conduction may be deteriorated, and low ionic conductivity may be obtained. In addition, in the case that the structure of a repeating unit forming a main chain includes oxygen or is long, the movement of Li ions may be problematic.

Thus, there is provided in the present invention, a lithium secondary battery obtaining high ionic conductivity and high power even though decreasing the amount of an electrolyte salt in a non-aqueous electrolyte through solving the concentration polarization of a secondary battery and securing cycle life properties and safety through preventing the elution of a transition metal in high temperature or high voltage environment.

Particularly, there is provided in the present invention, a lithium secondary battery including a cathode, an anode, a separator disposed between the cathode and the anode and a non-aqueous electrolyte, wherein an ionomer represented by the following Formula 1 is included in at least one element selected from the group consisting of the cathode, the anode, the separator and the non-aqueous electrolyte.

[Formula 1]

In the above Formula, A and B are independently H, F, $CH_3$, $CF_3$ or $CF_2H$, a molar ratio of $—CF—O—(CF_2)_2—SO_3^-Li^+{:}—CF_2—$ is 10 to 100:0 to 90, and k is an integer of at least 1.

In addition, a weight average molecular weight of the ionomer represented by the above Formula 1 may be from 240 to 200,000, and particularly, from 240 to 10,000.

Particularly, the ionomer represented by the above Formula 1 may include a main chain composed of carbons of which hydrogen atoms are completely or partially substituted with fluorine atoms and a side chain including a fluoroalkyl sulfonate substituent.

In addition, the ionomer represented by the above Formula 1 is a single ion conductor and may play the role of a lithium source excluding anions instead of an electrolyte salt contained in an electrolyte. That is, in the case in which the ionomer represented by the above Formula 1 is introduced, only a lithium source may be provided with anions as a fixed phase in a battery, and the amount of an electrolyte salt included in a non-aqueous electrolyte, etc. may be decreased and at the same time, high power effects may be obtained through solving concentration polarization, and the degree of freedom of lithium ions in the electrolyte may be increased. In addition, the side reactions accompanied by the anions of the electrolyte salt may be restrained, and the cycle life properties and stability of a secondary battery in a high temperature and a high voltage may be realized. In the case that the ionomer represented by the above Formula 1 is included in the electrolyte, the molar ratio of $—CF—O—(CF_2)_2—SO_2^-Li^+{:}—CF_2—$ in the above Formula 1 may be 10 to 100:0 to 90, and may particularly be 10 to 90:10 to 90.

In addition, in the case that anions are introduced in an electrode as a fixed phase using the ionomer represented by the above Formula 1, resistance due to concentration polarization that may be generated at the late period of discharge in an anode, may be decreased, and resistance increase at the initial stage of discharge due to the anion concentration polarization of Li salt during full charge in a cathode may be solved. In the case that the ionomer represented by the above Formula 1 is included in the electrode, the molar ratio of —CF—O—(CF$_2$)$_2$—SO$_3$$^-$Li$^+$:—CF$_2$— in the above Formula 1 may preferably be 10 to 90:10 to 90.

Particularly, in the case that the length of the side chain of the ionomer including SO$_3$$^-$ enabling the substitution of Li is short and has less than or equal to 5 carbon atoms as in the present invention, ionic conductivity may be high, and electrochemical stability may be improved because the structure of a repeating unit forming a main chain is a fluorinated structure.

In this case, the amount of the ionomer represented by the above Formula 1 included in the elements constituting the secondary battery is not specifically limited and may be appropriately controlled according to the kind of the elements constituting the lithium secondary battery, for example, an electrode active material, an electrode and a separator within the range of realizing high power through the solving of the concentration polarization of the secondary battery, the cycle life and stability of the secondary battery in a high temperature and a high voltage. That is, the above-described effects may be obtained only if the ionomer is included in the element constituting the secondary battery regardless of the amount, use, position included, etc.

Particularly, the elements constituting the secondary battery and including the ionomer represented by the above Formula 1 may have the following embodiments, however the present invention is not limited thereto.

(A) Electrode Containing Ionomer Represented by Formula 1

First, an electrode including the ionomer represented by the above Formula 1 is provided in the present invention. Particularly, the electrode of the present invention may include the ionomer represented by the above Formula 1 as a coating component of an electrode active material, or in a composition of an electrode or a coating component of the surface of an electrode. In this case, the electrode may be an anode or a cathode, and the application scope thereof is not specifically limited.

In addition, the amount of the ionomer in the electrode is not specifically limited only if in an amount range possibly realizing the cycle life and stability of the secondary battery in a high temperature and a high voltage. Particularly, the amount of the ionomer may be from about 0.01 to about 20 wt % with respect to the total amount of an electrode mixture.

(A-1) Coating Component of Electrode Active Material

Particularly, an electrode including an electrode active material and a coating layer including the ionomer represented by the above Formula 1 and formed on the surface of the electrode active material is provided in the present invention.

The electrode may be a cathode or an anode. In the case that the electrode is the cathode, the electrode active material may be a common cathode active material used in a cathode for a common lithium secondary battery, without limitation. In this case, typical examples of the cathode active material may include a lithium nickel manganese composite oxide (LNMO) and other materials, for example, a layer-structured compound such as lithium cobalt oxide (LiCoO$_2$), lithium nickel oxide (LiNiO$_2$), etc.; a lithium transition metal composite oxide substituted with a transition metal such as Li(Ni$_a$Co$_b$Mn$_c$)O$_2$ (0<a<1, 0<b<1, 0<c<1, and a+b+c=1); a lithium manganese oxide such as LiMnO$_3$, LiMn$_2$O$_4$, LiMnO$_2$, etc.; lithium copper oxide (Li$_2$CuO$_2$); a vanadium oxide such as LiV$_3$O$_8$, V$_2$O$_5$, Cu$_2$V$_2$O$_7$, etc.; LiFe$_3$O$_4$; a lithium phosphate such as LiFePO$_4$, LiCoPO$_4$, LiFe$_x$Mn$_{1-x}$PO$_4$, etc.; a Ni site type lithium nickel oxide represented by a Formula of LiNi$_{1-x}$M$_x$O$_2$ (where M=Co, Mn, Al, Cu, Fe, Mg, B or Ga, and x=0.01 to 0.3); a lithium manganese composite oxide represented by a Formula of LiMn$_{2-x}$M$_x$O$_2$ (where M=Co, Ni, Fe, Cr, Zn or Ta, and x=0.01 to 0.1) or Li$_2$Mn$_3$MO$_8$ (where M=Fe, Co, Ni, Cu or Zn), etc., without limitation.

In addition, in the case that the electrode is the anode, the electrode active material may be a common anode active material used in an anode of a common lithium secondary battery, without specific limitation. Typical examples of the anode active material used may include a lithium titanium oxide (LTO), and other materials, for example, carbon such as hard carbon, graphite, graphite-based carbon, etc.; a metal composite oxide such as Li$_x$Fe$_2$O$_3$ (0≤x≤1), Li$_x$WO$_2$ (0≤x≤1), Sn$_x$Me$_{1-x}$Me'$_y$O$_z$ (Me: Mn, Fe, Pb, Ge; Me': Al, B, P, Si, elements in groups 1, 2 and 3, halogen; 0<x≤1; 1≤y≤3; 1≤z≤8); a lithium metal; a lithium alloy; a silicon alloy; a tin alloy; a metal oxide such as SnO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, and Bi$_2$O$_5$; a conductive polymer such as polyacetylene; a Li—Co—Ni-based material; titanium oxide, etc.

In addition, in the present invention, a coating method of the electrode active material may be a common coating method used in this field, for example, a solvent evaporation method, a co-precipitation method, a precipitation method, a sol-gel method, a filtration after adsorption method, a sputtering method, a CVD method, etc. The coating method of the electrode active material is not specifically limited. A preferred embodiment may include (a) a preparing step of a coating solution containing the ionomer represented by the above Formula 1 by dispersing the ionomer represented by the above Formula 1 in a binder solution; (b) a coating step by adding the particles of an electrode active material in the coating solution and stirring; and (c) a step of heat treating of the electrode active material coated with the ionomer represented by the above Formula 1.

(A-2) Composition of Electrode

In addition, there is provided in the present invention, an electrode including an electrode collector, and a composition coated on the electrode collector, wherein the composition of the electrode includes an electrode active material and the ionomer represented by the above Formula 1.

In this case, the composition of the electrode is not specifically limited, however may selectively include a binder, a conductive material and a solvent other than the electrode active material and the ionomer represented by the above Formula 1.

In addition, in the present invention, the method of manufacturing the electrode is not specifically limited and may include (a) a step of preparing a binder solvent; (b) a step of preparing an electrode slurry by dispersing and mixing an electrode active material, the ionomer represented by the above Formula 1, and selectively a conductive material in the binder solvent; (c) a step of applying or coating the electrode slurry thus prepared on an electrode collector; and (d) a step of drying by heat treatment.

In the electrode collector, a cathode collector may be aluminum, nickel or a foil formed by the combination thereof, without limitation, and an anode collector may be copper, gold, nickel, aluminum, a copper alloy, or a foil formed by the combination thereof, without limitation.

In addition, the binder solvent may be prepared by inserting a binder (for example, polyvinylidene fluoride (PVDF)) in a solvent or a dispersing medium (for example, N-methyl pyrrolidone (NMP)).

In this case, the solvent or the dispersing medium may be all solvents commonly used in this field, and may typically include, for example, an organic solvent such as N-methyl-2-pyrrolidone, acetone, dimethylacetamide, dimethylformaldehyde, etc., an inorganic solvent such as water, or a mixture thereof. With respect to the amount used of the solvent, an amount capable of sufficiently dissolving and dispersing an active material, a conductive material, an electrode binder and an adhesiveness additive in consideration of the coated thickness of the electrode slurry and production yield. After coating the electrode slurry on the current collector, the solvents are removed by drying.

In addition, as the binder, a common bonding material may be used in an appropriate amount, and non-limiting examples thereof may include PVDF, a styrene butadiene rubber, Teflon, and a mixture thereof.

In addition, as the conductive material used for the preparation of the electrode slurry, the kind and the amount of a common conductive material used in this field may be applied, without limitation. Non-limiting examples thereof may include acetylene black, carbon black or graphite.

In addition, the applying or coating step of the electrode slurry, and the drying step of the electrode may also be any common methods known in this field. The drying step of the electrode may be, for example, a hot air drying.

(A-3) Coating Component of Electrode

In addition, there is provided in the present invention, an electrode including a coating layer formed by using the ionomer represented by the above Formula 1 on the surface of an electrode formed in advance.

A method of coating the ionomer represented by the above Formula 1 on the surface of the electrode formed in advance may also be a common method known in this field. In an embodiment, in the binder solution or solvent, the ionomer is dispersed to prepare a dispersion containing the ionomer, and the dispersion is coated on the surface of the electrode formed in advance and dried.

On the surface of the electrode of the present invention formed according to the above various methods, a coating layer including the ionomer represented by the above Formula 1 may be formed entirely or partially.

(B) Separator Including Ionomer Represented by Formula 1

In addition, a separator including the ionomer represented by the above Formula 1 is provided in the present invention. In this case, the separator may be a freestanding separator of a membrane film type formed by using only the ionomer represented by the above Formula 1, or a composite porous separator including a coating layer including the ionomer represented by the above Formula 1 on a porous base.

The amount of the ionomer in the separator is not specifically limited only if in an amount range realizing the cycle life or stability of a secondary battery in high temperature and high voltage conditions. Particularly, the amount may be from 0.01 to 20 parts by weight based on 100 parts by weight of the total components of the separator.

(B-1) Freestanding Separator Formed by using Ionomer

In particular, a freestanding separator formed by using only the ionomer represented by the above Formula 1 is provided in the present invention.

The freestanding separator may be formed using a mixture of the ionomer represented by the above Formula 1 and a binder polymer. For example, the ionomers represented by the above Formula 1 may be combined and connected to each other by the binder polymer to form the freestanding separator. In this case, a porous structure having a uniform size may be formed in the freestanding separator.

The size and the porosity of pores formed in the independent type separator are not specifically limited, and particularly, the porosity may be from 5 to 95%, and the size of the pore (diameter) may be from 0.01 to 50 μm.

(B-2) Porous Separator Including Coating Layer Containing Ionomer

In addition, a composite (porous) separator including a coating layer containing the ionomer represented by the above Formula 1 on the separator (porous separator) for a common secondary battery, may be provided as another embodiment in the present invention.

For example, a separator including a coating layer containing the ionomer represented by the above Formula 1 formed on a porous base may be manufactured by dipping a polyolefin-based porous separator base in a coating solution including the ionomer represented by the above Formula 1, or by coating the coating solution by a common coating method and removing solvents. In this case, the coating layer containing the ionomer may be obtained as a coating layer mixed with an inorganic material according to conditions.

In this case, the porous separator possibly introducing the ionomer represented by the above Formula 1 may be any porous materials blocking inner short of both electrodes and being impregnated with an electrolyte, without limitation. The pore diameter of the separator may be generally from 0.01 to 10 μm, and the thickness thereof may be generally in a range of 5 to 300 μm.

The separator may include, for example, an olefin-based polymer such as chemical-resistant and hydrophobic polypropylene; a composite porous separator obtained by adding an inorganic material in a porous separator base; a sheet or a non-woven fabric formed by using a glass fiber or polyethylene, etc. When a solid electrolyte such as a polymer is used as the electrolyte, the solid electrolyte may also be used as the separator.

(C) Electrolyte Including Ionomer Represented by Formula 1

In addition, an electrolyte including the ionomer represented by the above Formula 1 is provided in the present invention. Particularly, a non-aqueous electrolyte including an electrolyte salt and a non-aqueous organic solvent and further including the ionomer represented by the above Formula 1 as an additive may be provided.

Particularly, in the non-aqueous electrolyte, since the ionomer introduced in the element constituting the lithium secondary battery may play the role of a lithium source instead of the electrolyte salt included in the electrolyte, only the non-aqueous organic solvent may be included excluding the electrolyte salt, which has been included as an essential component.

The non-aqueous organic solvent may be any organic solvents that may be used as a solvent of a common non-aqueous electrolyte, without limitation. Typical examples of the non-aqueous organic solvent may include at least one organic solvent selected from the group consisting of a cyclic carbonate compound, a linear carbonate compound, a lactone, an ether compound, an ester compound, a sulfoxide, a lactam and a ketone.

The cyclic carbonate compound may include ethylene carbonate (EC), propylene carbonate (PC), butylenes carbonate (BC), fluoroethylene carbonate (FEC), etc., the linear carbonate compound may include diethyl carbonate (DEC), dimethyl carbonate (DMC), dipropyl carbonate (DPC), ethyl methyl carbonate (EMC), methyl propyl carbonate (MPC), etc. The lactone may include gamma butyrolactone (GBL), and the ether compound may include dibutyl ether, tetrahydrofuran, 2-methyl tetrahydrofuran, 1,4-dioxane, 1,2-dimethoxyethane, 1,2-diethoxyethane, etc. The ester compound may include methyl formate, ethyl formate, propyl formate, methyl acetate, ethyl acetate, propyl acetate, methyl propionate, ethyl propionate, butyl propionate, methyl pivalate, etc. In addition, the sulfoxide may include dimethylsulfoxide, etc., and the lactam may include N-methyl-2-pyrrolidone (NMP), etc. and the ketone may include polymethyl vinyl ketone. In addition, a halogen derivative of the organic solvent may be used. These solvents may be used alone or as a mixture thereof.

In addition, in the case that an electrolyte salt is included in the non-aqueous electrolyte of the present invention, the electrolyte salt may be an electrolyte salt for a common electrochemical device, and may be a combination of (i) at least one cation selected from the group consisting of $Li^+$, $Na^+$ and $K^+$ and (ii) at least one anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, without limitation. These electrolyte salts may be used alone or as a mixture thereof. The amount of the electrolyte salt is not specifically limited, and may be less than or equal to 50 wt % with respect to the total amount of the non-aqueous electrolyte, and may particularly be from 0 to 30 wt %. The electrolyte salt may particularly include a lithium salt or a lithium imide salt.

In addition, the amount of the ionomer represented by the above Formula 1 in the electrolyte is not specifically limited only in an amount range by which the amount of the electrolyte salt may be decreased, the high power effect may be obtained through the solution of concentration polarization, the degree of freedom of lithium ions in the electrolyte may be increased, side reactions accompanied from the anions of the electrolyte salt may be restrained, and the cycle life and stability of the secondary battery in a high temperature and a high voltage may be realized. Particularly, the amount may be 0.01 to 20 parts by weight based on 100 parts by weight of the total amount of the electrolyte.

In addition, the lithium secondary battery may use various kinds of electrolyte compositions such as a polymer electrolyte, etc. as a mixture instead of the non-aqueous electrolyte, and the kind of the electrolyte composition is not specifically limited.

Meanwhile, the lithium ion secondary battery according to the present invention may be manufactured by a common method known in this field and may be manufactured by disposing a separator between a cathode and an anode and assembling, and inserting the non-aqueous electrolyte therein. In this case, the ionomer represented by the above Formula 1 may be introduced in at least one of the electrode and the separator.

Mode for Carrying Out the Invention

In the detailed description of the present invention as described above, preferred embodiments has been described. The present invention may, however, be embodied in different forms within the scope of the present invention. The technical spirit of the present invention should not be construed as limited to the embodiments set forth herein, rather, should be determined by the claims and the equivalents thereof.

EXAMPLES

1. Electrode Including Ionomer

Example 1

96 wt % of LTO as an anode active material, 4 wt % of PVdF as a binder, 2 wt % of the ionomer of the above Formula 1 (weight average molecular weight of about 308), and 1 wt % of carbon black as a conductive material were added in an NMP solvent to prepare an anode slurry. The anode slurry was applied on an aluminum thin film of an anode collector having a thickness of 10 μm and dried to manufacture an anode.

Then, 92 wt % of a LNMO spinel compound as a cathode active material, 4 wt % of carbon black as a conductive material, and 4 wt % of PVdF as a bonding material were added in an NMP solvent to prepare a cathode slurry. The cathode slurry was applied on an aluminum (Al) thin film of a cathode collector having a thickness of 20 μm and dried to manufacture a cathode.

A polyolefin-based separator was interposed between the anode and the cathode thus manufactured to manufacture an electrode assembly, and a non-aqueous electrolyte of 0.5 M $LiPF_6$ (EC/PC/DEC=30/20/50 wt %) was inserted therein to manufacture a high voltage full cell of a 5 V grade via the introduction of an LTO anode.

Comparative Example 1

A high voltage full cell of a 5 V grade was manufactured by conducting the same procedure described in the above Example 1 except for including 6 wt % of PVdF as the binder and inserting a non-aqueous electrolyte of 0.5 M $LiPF_6$ during preparing an electrolyte, and excluding the ionomer of the above Formula 1 during manufacturing an anode.

Experimental Example 1

Experiment of Improving Cycle Life

Figure 1:
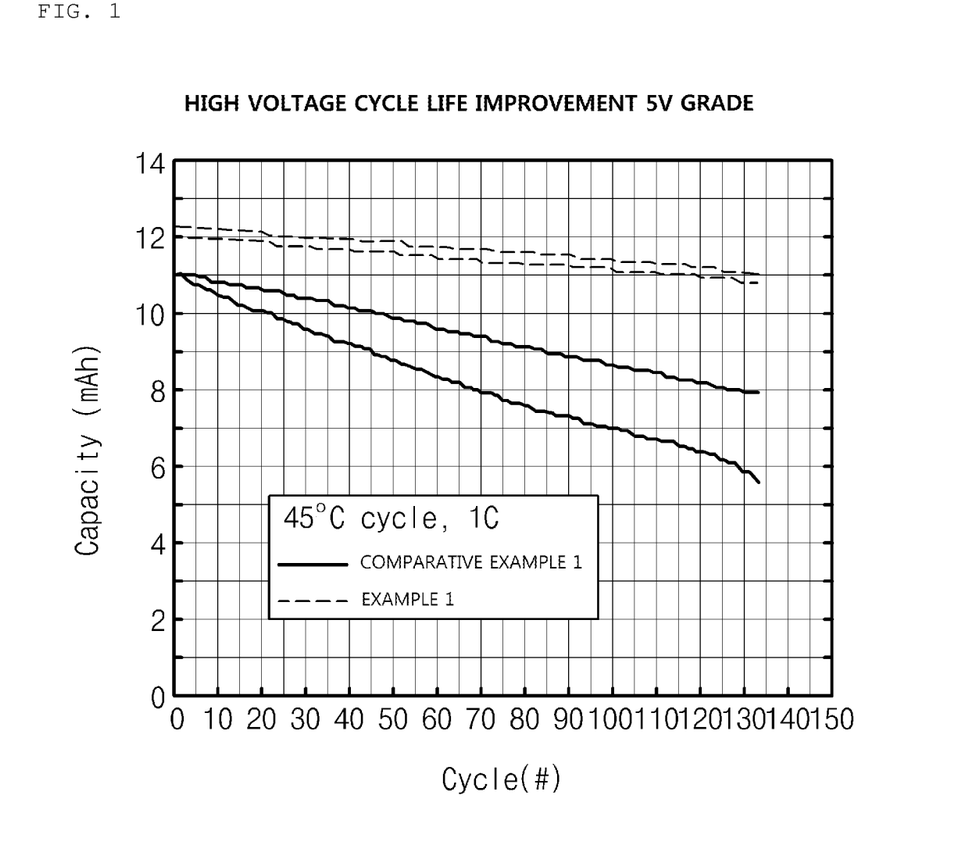
FIG. 1 is a graph illustrating the measured results of cycle life at high voltage according to Experimental Example 1 of the present invention.

To evaluate the C-rate properties of the lithium secondary battery including the ionomer according to the present invention, the followings were conducted. That is, the lithium secondary battery of Example 1 and the lithium secondary battery of Comparative Example 1 were cycled with the charge and discharge rate of 1C/1C at 45° C., and the charge and discharge capacities thereof are illustrated in FIG. 1.

From the experimental result, it would be secured that the cycle life properties of the lithium secondary battery of Example 1 of the present invention were improved when compared to those of Comparative Example 1.

Experimental Example 2

Figure 2:
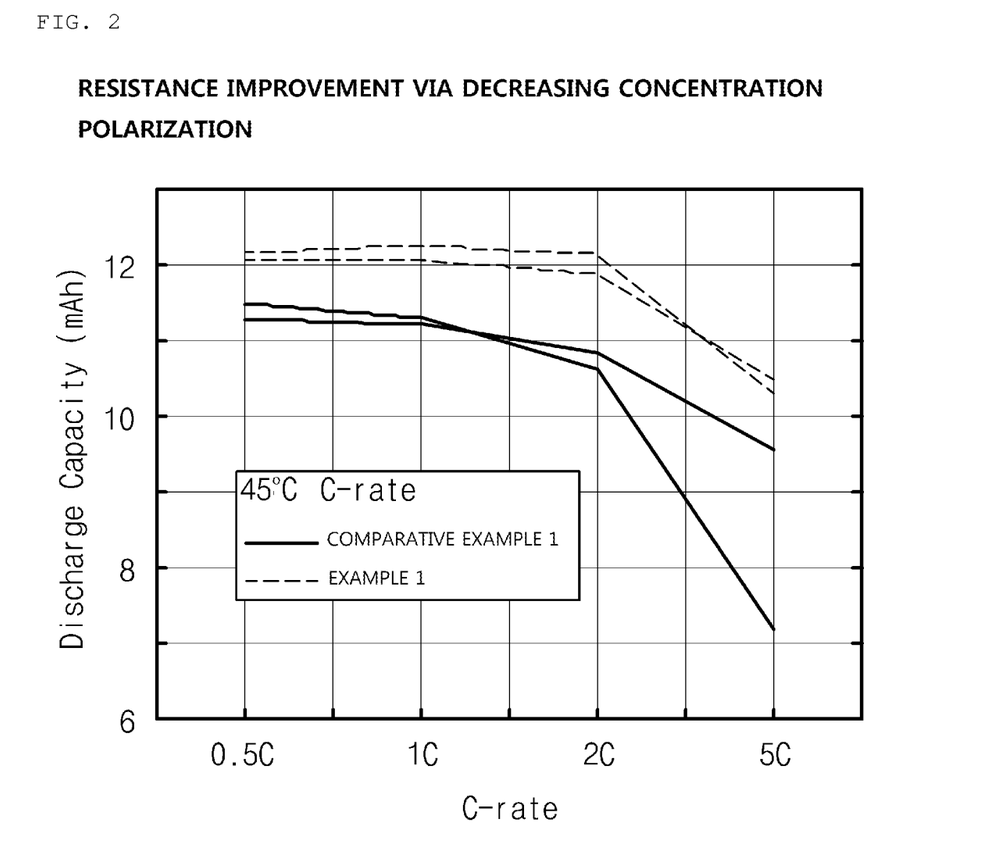
FIG. 2 is a graph showing the change of discharge capacity with respect to the increase of C-rate according to Experimental Example 2 of the present invention.

Experiment on Improving Battery Resistance Via Decreasing Concentration Polarization The capacity change was observed by fixing the charge rate of each lithium secondary battery of Example 1 and Comparative Example 1 to 0.5 C at 45° C., and changing the discharge rate from 0.5 C to 5C, and rate properties were evaluated. The results are illustrated in FIG. 2.

From the experiment, the resistance by concentration polarization was decreased, and the decreasing degree of discharge capacity with the increase of C-rate was low in the lithium secondary battery introducing the ionomer and including decreased amount of an electrolyte salt in a non-aqueous electrolyte according to the present invention when compared to the lithium secondary battery of Comparative Example 1.

2. Cathode Including Ionomer

Example 2

92 wt % of an LNMO spinel-based compound as a cathode active material, 4 wt % of carbon black as a conductive material, 2 wt % of PVdF as a bonding material, 2 wt % of the ionomer of the above Formula 1 (weight average molecular weight of about 308) were added in an NMP solvent to prepare a cathode slurry. The cathode slurry was applied on an Al thin film of a cathode collector having a thickness of 20 μm and dried to manufacture a cathode. A Li metal was used as an anode.

A polyolefin-based separator was interposed between the anode and the cathode thus manufactured to manufacture an electrode assembly, and a non-aqueous electrolyte of 0.5 M $LiPF_6$ (EC/PC/DEC=30/20/50 wt %) was inserted therein to manufacture a high voltage half cell of a 5 V grade via the introduction of an LNMO cathode active material.

Comparative Example 2

A high voltage hall cell of a 5 V grade was manufactured by conducting the same procedure described in the above Example 2 except for including 4 wt % of PVdF as the binder and inserting a non-aqueous electrolyte of 0.5 M $LiPF_6$ during preparing an electrolyte, and excluding the ionomer of the above Formula 1 during manufacturing a cathode.

Experimental Example 3

Restraining of Polarization Via Discharge Curve

Figure 3:
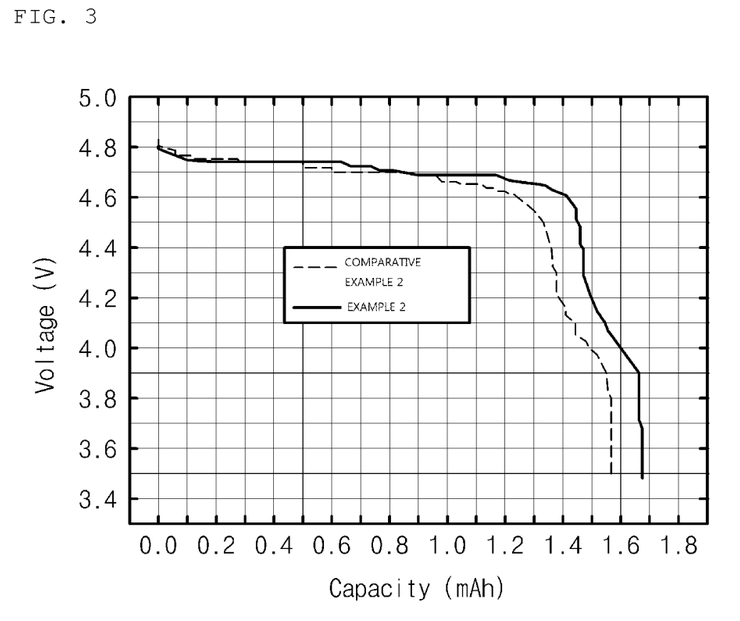
FIGS. 3 and 4 are graphs illustrating discharge capacities and discharge curves according to Experimental Example 3 of the present invention.
Figure 4:
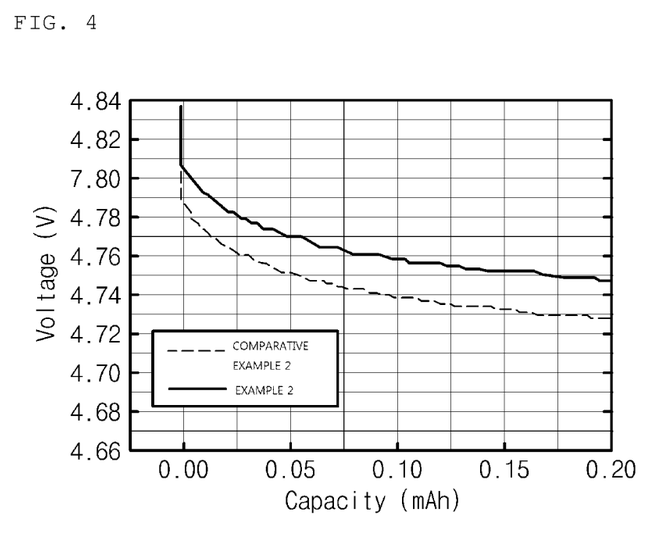

The following was performed to observe the restraining properties of the polarization phenomenon of a lithium secondary battery including the ionomer of the present invention. That is, the lithium secondary battery of the above Example 2 and the lithium secondary battery of the above Comparative Example 2 were charged with 1 C at 23° C., and the discharge capacity and discharge curve thereof are illustrated in FIGS. 3 and 4.

From the experimental results, it would be secured that the polarization phenomenon of the lithium secondary battery of Example 2 of the present invention was restrained, the resistance thereof was decreased, and the capacity was increased at the same rate when compared to those of the lithium secondary battery of Comparative Example 2.

Experimental Example 4

Evaluation of Life Performance

Figure 5:
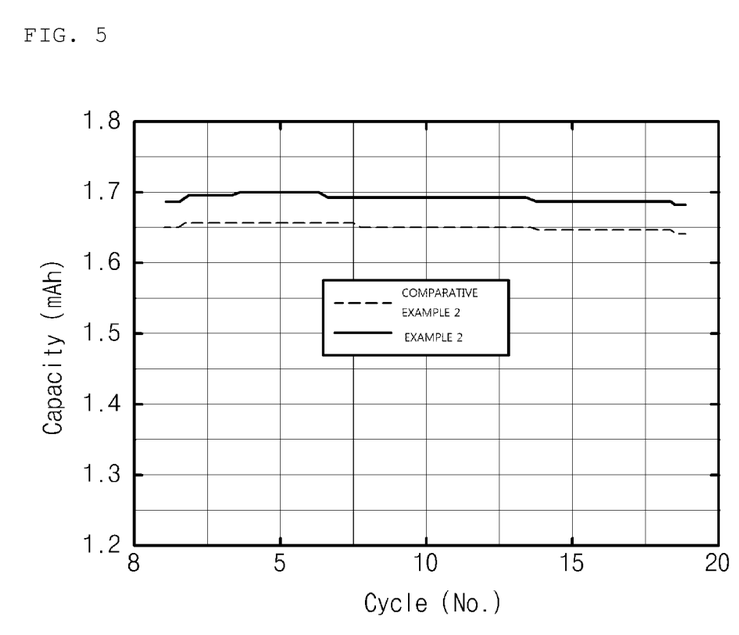
FIG. 5 is a graph illustrating the measured results of cycle life according to Experimental Example 4 of the present invention.

1C/1C Charge and discharge performance at 45° C. was observed for each lithium secondary battery according to Example 2 and Comparative Example 2, and the results are illustrated in FIG. 5.

From the experimental results, the lithium secondary battery introducing the ionomer and including decreased amount of the electrolyte salt in the non-aqueous electrolyte according to Example 2 of the present invention, has equal maintaining ratio of life and increased capacity when compared to those of the lithium secondary battery of Comparative Example 2.

3. Anode Including Ionomer

Example 3

96 wt % of graphite as an anode active material, 5 wt % of PVdF as a binder, 5 wt % of the ionomer of the above Formula 1 (weight average molecular weight of about 308), and 1 wt % of carbon black as a conductive material were added in an NMP solvent to prepare an anode slurry. The anode slurry was applied on an Al thin film of an anode collector having a thickness of 10 μm and dried to manufacture an anode.

A Li metal was used as a cathode.

A polyolefin-based separator was interposed between the anode and the cathode thus manufactured to manufacture an electrode assembly, and a non-aqueous electrolyte of 0.5 M $LiPF_6$ (EC/PC/DEC=30/20/50 wt %) was inserted therein to manufacture a high voltage half cell of a 5 V grade via the introduction of a graphite anode active material.

Comparative Example 3

A high voltage half cell of a 5 V grade was manufactured by conducting the same procedure described in the above Example 3 except for including 10 wt % of PVdF as the binder and inserting a non-aqueous electrolyte of 0.5 M $LiPF_6$ during preparing an electrolyte, and excluding the ionomer of the above Formula 1 during manufacturing an anode.

Experimental Example 5

Securing of Resistance Decrease Through Restraining of Polarization

Figure 6:
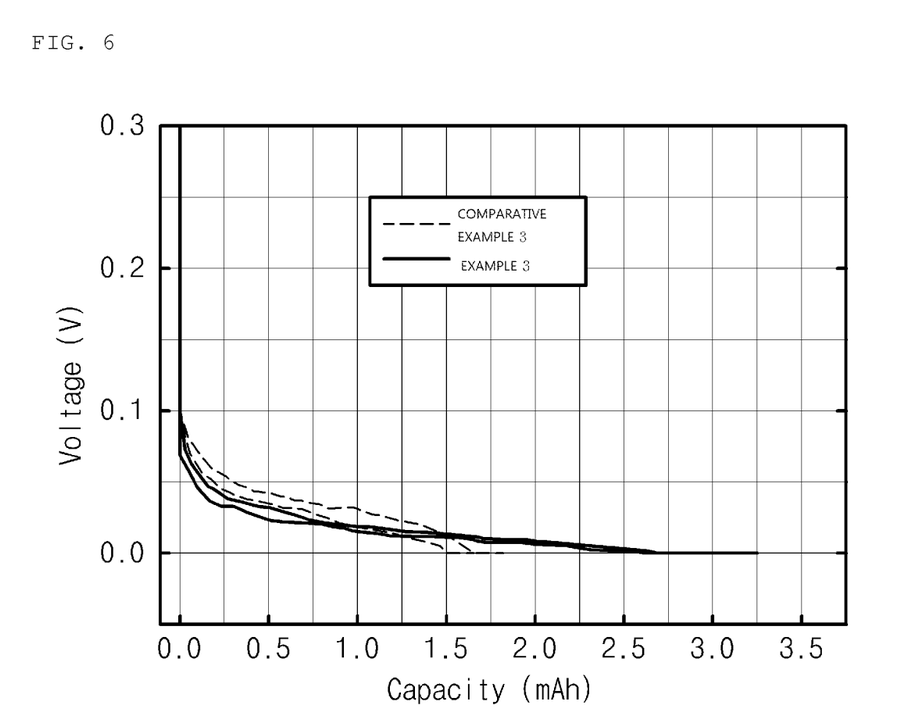
FIG. 6 is a graph showing the charge change with respect to the increase of C-rate according to Experimental Example 5 of the present invention.

The following was performed to observe the resistance decreasing effects of the lithium secondary battery including the ionomer of the present invention. That is, the lithium secondary battery of the above Example 3 and the lithium secondary battery of the above Comparative Example 3 were charged with 1 C at 23° C., and the charge curves thereof are illustrated in FIG. 6.

From the experimental results, it would be secured that the resistance of the lithium secondary battery according to Example 3 was decreased when compared to that of the lithium secondary battery of Comparative Example 3.

While this invention has been particularly shown and described with reference to preferred embodiments thereof and drawings, it will be understood by those skilled in the art that various changes in form and details may be made therein without departing from the spirit and scope of the invention as defined by the appended claims.

The invention claimed is:

1. A lithium secondary battery comprising a cathode, an anode, a separator disposed between the cathode and the anode, and a non-aqueous electrolyte, wherein an ionomer represented by the following Formula 1 is comprised in the cathode, or the anode:

[Formula 1]

wherein A and B are independently H, F, CH$_3$, CF$_3$ or CF$_2$H, a molar ratio of —CF—O—(CF$_2$)$_2$—SO$_3^-$Li$^+$:—CF$_2$— is 10 to 90:10 to 90, and k is an integer of at least 1.

2. The lithium secondary battery of claim 1, wherein a weight average molecular weight of the ionomer represented by the above Formula 1 is from 240 to 200,000.

3. The lithium secondary battery of claim 1, wherein the ionomer represented by the above Formula 1 plays the role of a lithium ion source.

4. The lithium secondary battery of claim 1, wherein the cathode comprises the ionomer represented by the above Formula 1 in a composition of the cathode, a coating component of a cathode active material, or a coating component of the cathode.

5. The lithium secondary battery of claim 4, wherein an amount of the ionomer represented by the above Formula 1 is from 0.01 to 20 wt % based on a total amount of a mixture of the cathode.

6. The lithium secondary battery of claim 1, wherein the anode comprises the ionomer represented by the above Formula 1 in a composition of the anode, a coating component of an anode active material, or a coating component of the anode.

7. The lithium secondary battery of claim 6, wherein an amount of the ionomer represented by the above Formula 1 is from 0.01 to 20 wt % based on a total amount of a mixture of the anode.

8. The lithium secondary battery of claim 1, wherein the non-aqueous electrolyte comprises an electrolyte salt and a non-aqueous organic solvent.

9. The lithium secondary battery of claim 8, wherein the electrolyte salt comprises a combination of (i) at least one cation selected from the group consisting of Li$^+$, Na$^+$ and K$^+$ and (ii) at least one anion selected from the group consisting of PF$_6^-$, BF$_4^-$, Cl$^-$, Br$^-$, I$^-$, ClO$_4^-$, AsF$_6^-$, CH$_3$CO$_2^-$, CF$_3$SO$_3^-$, N(CF$_3$SO$_2$)$_2^-$ and C(CF$_2$SO$_2$)$_3^-$.

10. The lithium secondary battery of claim 8, wherein the non-aqueous organic solvent comprises at least one organic solvent selected from the group consisting of a cyclic carbonate compound, a linear carbonate compound, a lactone, an ether compound, an ester compound, sulfoxide, a lactam and a ketone.

11. The lithium secondary battery of claim 10, wherein the cyclic carbonate compound comprises at least one selected from the group consisting of ethylene carbonate (EC), propylene carbonate (PC), butylenes carbonate (BC) and fluoroethylene carbonate (FEC), the linear carbonate compound comprises at least one selected from the group consisting of diethyl carbonate (DEC), dimethyl carbonate (DMC), dipropyl carbonate (DPC), ethyl methyl carbonate (EMC) and methyl propyl carbonate (MPC), the lactone comprises gamma butyrolactone, the ether compound comprises at least one selected from the group consisting of dibutyl ether, tetrahydrofuran, 2-methyl tetrahydrofuran, 1,4-dioxane, 1,2-dimethoxyethane and 1,2-diethoxyethane, the ester compound comprises at least one selected from the group consisting of methyl formate, ethyl formate, propyl formate, methyl acetate, ethyl acetate, propyl acetate, methyl propionate, ethyl propionate, butyl propionate and methyl pivalate, the sulfoxide comprises dimethylsulfoxide, the lactam comprises N-methyl-2-pyrrolidone (NMP), and the ketone comprises polymethyl vinyl ketone.

* * * * *